United States Patent
Fischer et al.

(10) Patent No.: US 7,798,524 B2
(45) Date of Patent: Sep. 21, 2010

(54) AIR BAG MODULE WITH VENT

(75) Inventors: Kurt F. Fischer, Leonard, MI (US); Charles E. Steffens, Jr., Washington, MI (US); Stephen A. Ridella, Rochester, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 630 days.

(21) Appl. No.: 11/602,008

(22) Filed: Nov. 20, 2006

(65) Prior Publication Data

US 2008/0116672 A1 May 22, 2008

(51) Int. Cl.
*B60R 21/239* (2006.01)

(52) U.S. Cl. .................. 280/739; 280/729

(58) Field of Classification Search .......... 280/729, 280/739, 740
See application file for complete search history.

(56) References Cited

U.S. PATENT DOCUMENTS

| | | |
|---|---|---|
| 5,246,250 A | 9/1993 | Wolanin et al. |
| 5,695,214 A | 12/1997 | Faigle et al. |
| 5,709,405 A | 1/1998 | Saderholm et al. |
| 5,853,192 A | 12/1998 | Sikorski et al. |
| 5,899,494 A | 5/1999 | Lane, Jr. |
| 5,918,901 A | 7/1999 | Johnson et al. |
| 6,123,358 A | 9/2000 | Ryan et al. |
| 6,959,945 B2 * | 11/2005 | Fischer et al. ............ 280/739 |
| 2003/0155756 A1 | 8/2003 | Hawthorn et al. |
| 2007/0045997 A1 * | 3/2007 | Abe et al. ............ 280/729 |

* cited by examiner

*Primary Examiner*—Paul N Dickson
*Assistant Examiner*—Timothy D Wilhelm
(74) *Attorney, Agent, or Firm*—Tarolli, Sundheim, Covell & Tummino LLP

(57) ABSTRACT

An apparatus (10) helps protect an occupant (16) of a vehicle (12). The apparatus (12) includes an inflatable vehicle occupant protection device (14) that is inflatable to help protect the vehicle occupant (16). A vent opening (52) directs flow of inflation fluid away from the protection device (14). A vent member (60) is movable between an open condition enabling flow of inflation fluid away from the protection device (14) through the vent opening (52) and a closed condition at least partially blocking flow of inflation fluid away from the protection device through the vent opening. A panel (80) receives and transfers the force of inflation directed into the protection device to the vent member to urge the vent member toward the closed condition.

22 Claims, 3 Drawing Sheets

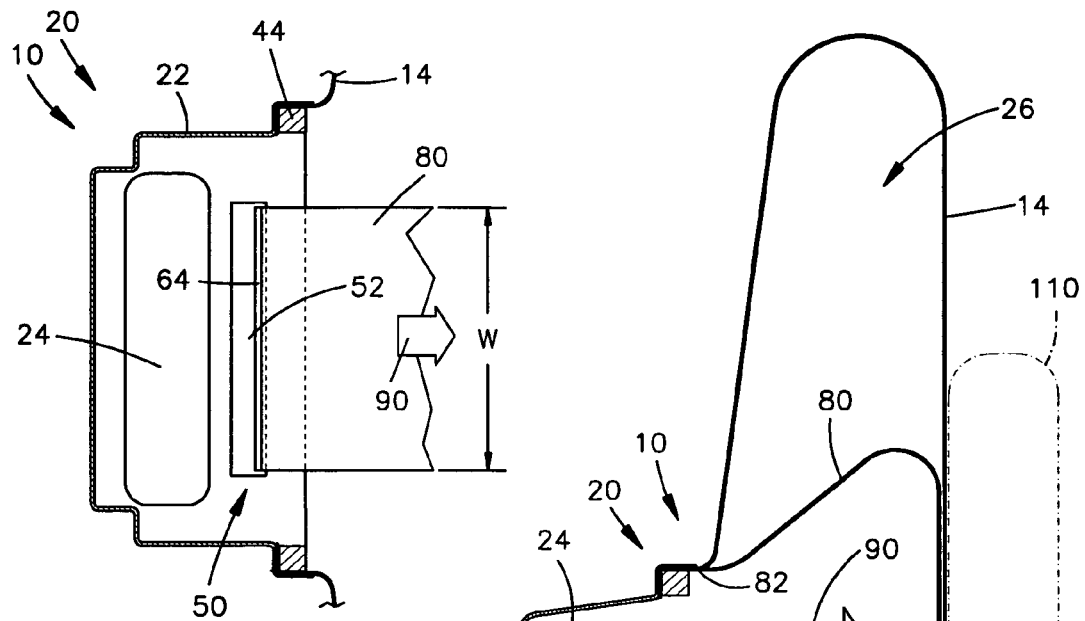
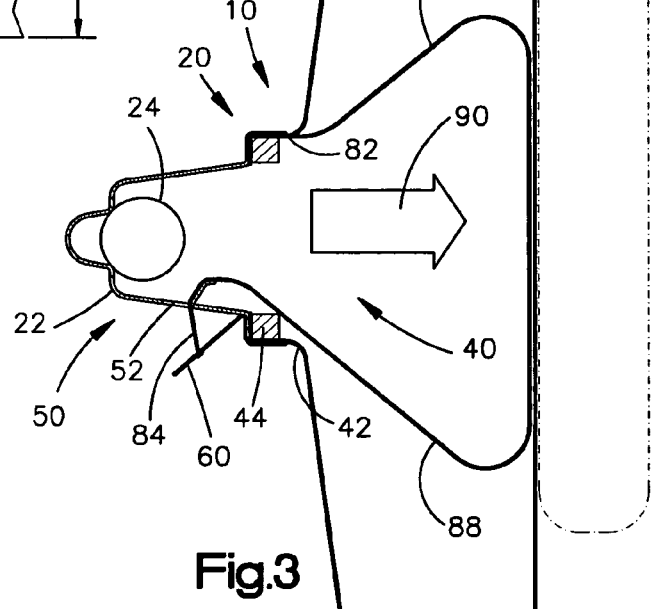
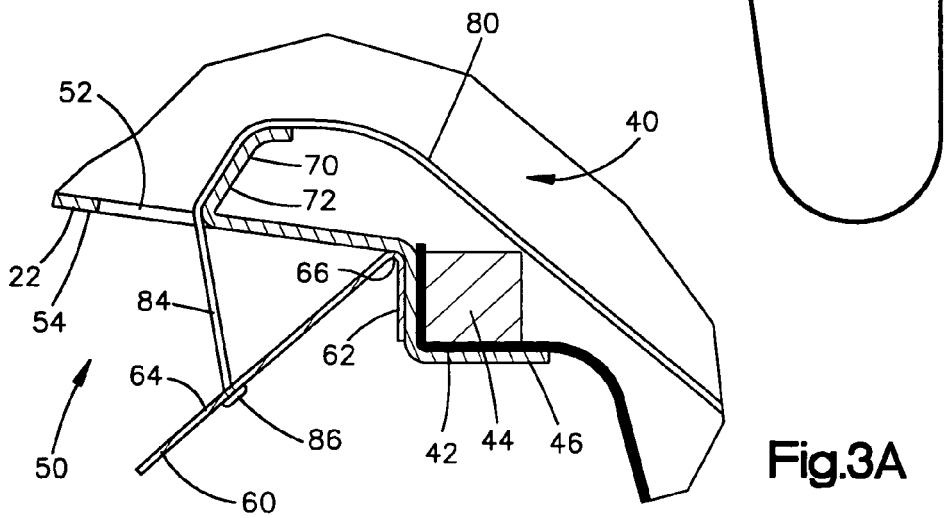

AIR BAG MODULE WITH VENT

BACKGROUND OF THE INVENTION

The present invention relates to a vehicle occupant protection apparatus. In particular, the present invention relates to an air bag module including a vent with a vent member that can be moved between an open condition and a closed condition.

DESCRIPTION OF RELATED ART

It is known to provide an air bag system or module with a vent for venting inflation fluid from the air bag. In some air bag modules, the vent may be selectively opened depending on sensed conditions, such as whether an occupant's seat belt is buckled. In other air bag modules, the vent is formed as two openings that have an aligned condition initially venting inflation fluid and a non-aligned condition blocking venting of inflation fluid once the air bag pressurizes to a predetermined amount. In other air bag modules, a tether attached to the air bag pulls a valve member closed when the air bag deploys a predetermined distance.

SUMMARY OF THE INVENTION

The present invention relates to an apparatus that helps protect an occupant of a vehicle. The apparatus includes an inflatable vehicle occupant protection device that is inflatable to help protect the vehicle occupant. A vent opening directs flow of inflation fluid away from the protection device. A vent member is movable between an open condition enabling flow of inflation fluid away from the protection device through the vent opening and a closed condition at least partially blocking flow of inflation fluid away from the protection device through the vent opening. A panel receives and transfers the force of inflation fluid directed into the protection device to the vent member to urge the vent member toward the closed condition.

The present invention also relates to an apparatus for helping to protect an occupant of a vehicle. The apparatus includes an inflatable vehicle occupant protection device that is inflatable to help protect an occupant of the vehicle. A panel separate from the protection device and disposed in an inflatable volume of the protection device is configured to receive inflation fluid directed into the inflatable volume and transfer the force of inflation fluid directed into the inflatable volume to a vent member to actuate the vent member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view illustrating a portion of the apparatus of FIG. 1 in a second deployment condition;

FIG. 3A is a magnified view of a portion of the apparatus of FIG. 2; and

FIG. 4 is a sectional view of a portion of the apparatus taken generally along line 4-4 in FIG. 2.

DETAILED DESCRIPTION OF THE INVENTION

Figure 1:
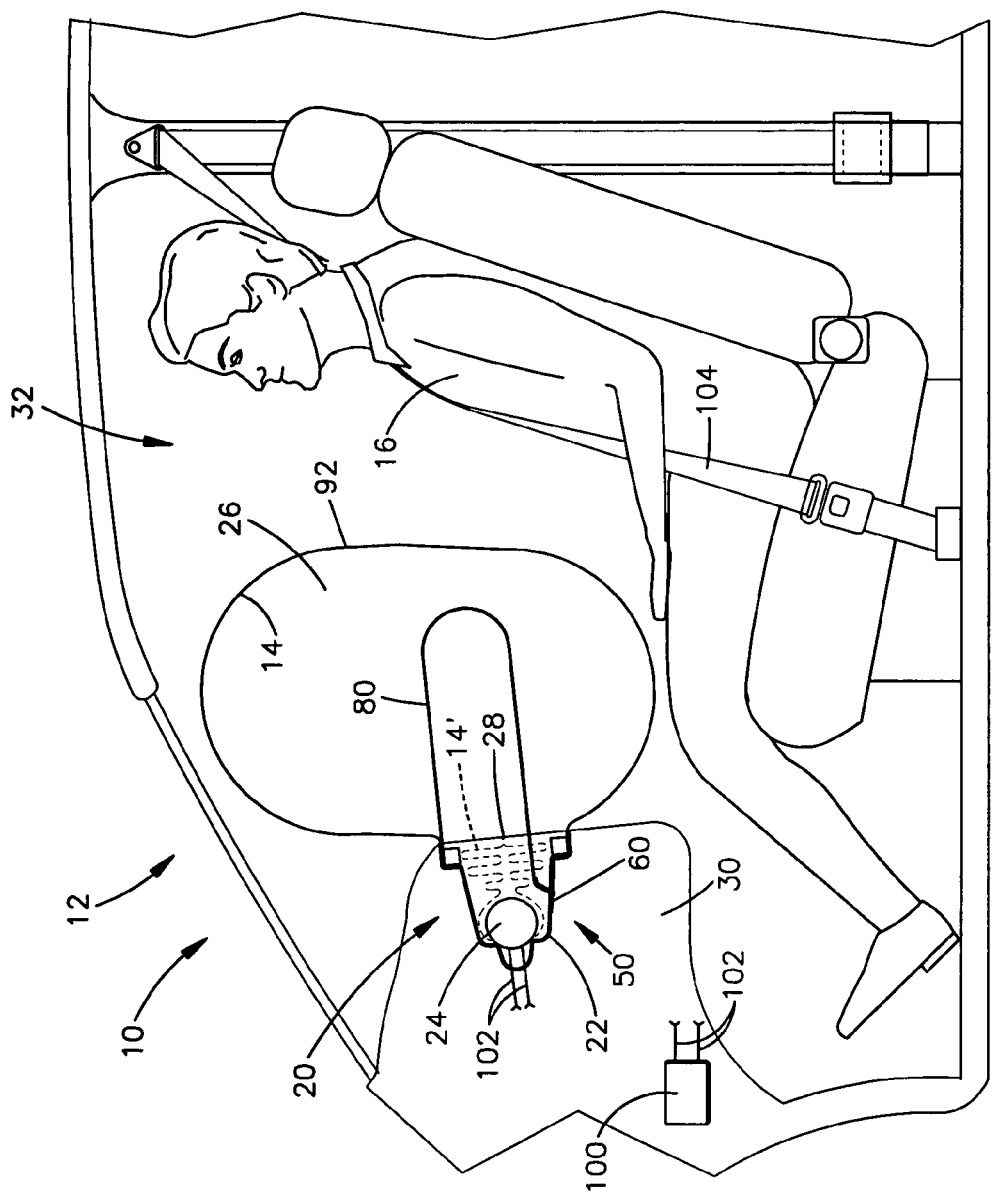
FIG. 1 is a schematic view of an apparatus for helping to protect an occupant of a vehicle in accordance with the present invention.

In accordance with the present invention, FIG. 1 illustrates an apparatus 10 for helping to protect an occupant 16 of a vehicle 12. The apparatus 10 comprises an air bag module 20 including a vehicle occupant protection device 14 in the form of an air bag. In the illustrated embodiment, the air bag module 20 is a passenger side front air bag module mounted in an instrument panel 30 on a passenger side 32 of the vehicle 12. Those skilled in the art will appreciate that the apparatus 10 may comprise a driver side front air bag module (not shown) mounted on a driver side of the vehicle 12, e.g., on a vehicle steering wheel.

The air bag 14 can be constructed of any suitable material, such as nylon (e.g., woven nylon 6-6 yarns). The air bag 14 may have a one piece woven construction or may include one or more pieces of material that are interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag module 20 also includes a housing 22 that helps define an enclosure for supporting the air bag 14 in a deflated and stored condition (illustrated generally at 14' in FIG. 1). In the illustrated passenger air bag module configuration, the housing 22 comprises a reaction canister mounted in the instrument panel 30. In a driver side configuration (not shown), the housing may comprise a mounting plate, reaction plate, cover, or a combination of these items, that is mounted to the vehicle steering wheel. The air bag module 20 also includes an inflator 24, supported in the housing 22, that is actuatable to provide inflation fluid for inflating an inflatable volume 26 of the air bag 14.

Figure 2:
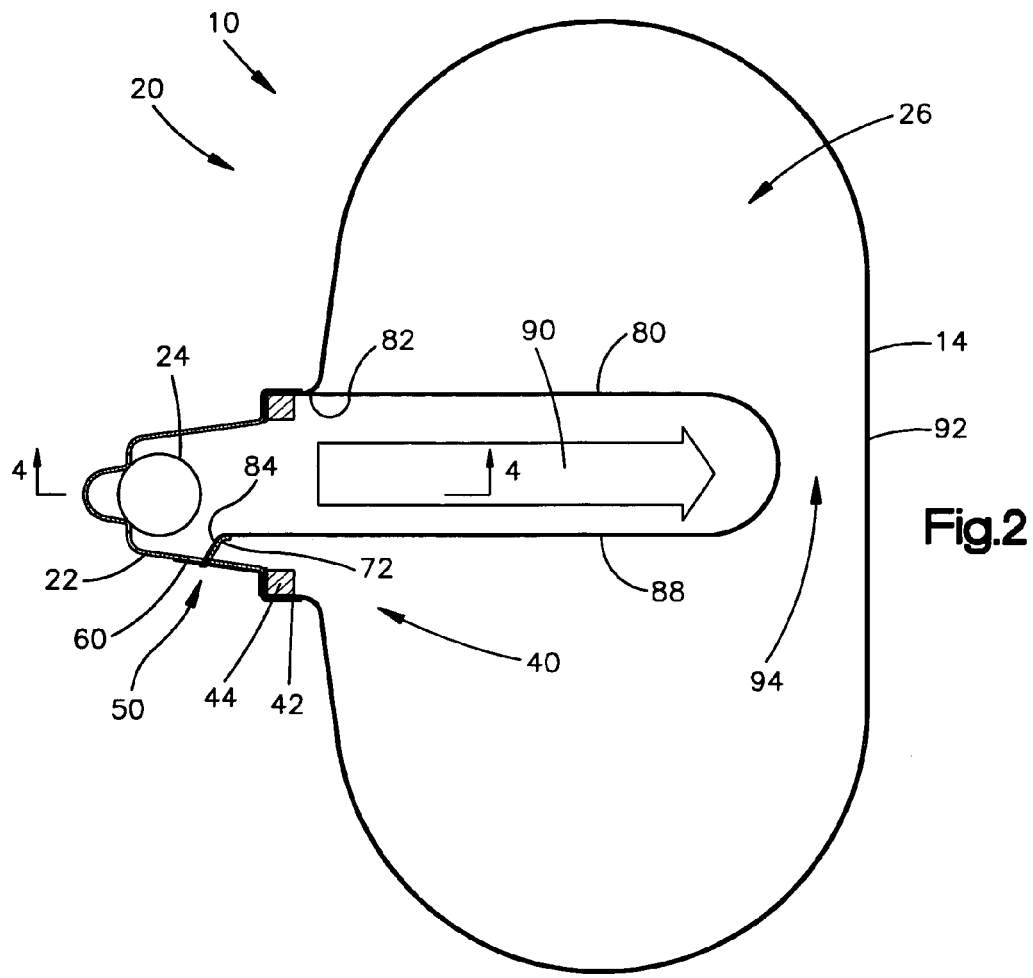
FIG. 2 is a sectional view illustrating a portion of the apparatus of FIG. 1 in a first deployment condition.

Referring to FIGS. 2-3A, the air bag 14 has a mouth portion 40 through which inflation fluid is directed into the inflatable volume 26. A peripheral portion 42 of the air bag 14 adjacent the mouth portion 40 is secured to the reaction canister 22 by a retainer 44 that is received in a channel 46 that extends along a periphery of the reaction canister 22. The peripheral portion 42 of the air bag 14 is clamped between the retainer 44 and the channel 46. The apparatus 10 also includes a cover 28 (FIG. 1) for concealing the air bag 14 in the deflated and stored condition in the reaction canister 22.

The inflator 24 may be of any type or configuration suited to provide inflation fluid to the air bag 14. For example, the inflator 24 may be a pyrotechnic inflator that uses the combustion of gas-generating material to generate inflation fluid. As another example, the inflator 24 may contain a stored quantity of pressurized inflation fluid (not shown) in the form of a gas for inflating the air bag 14. As another example, the inflator 24 could contain a combination of pressurized inflation fluid and ignitable material for heating the inflation fluid. As a further example, the inflator 24 could be of any suitable type or construction for supplying a medium for providing inflation fluid for inflating the air bag 14.

Figure 2A:
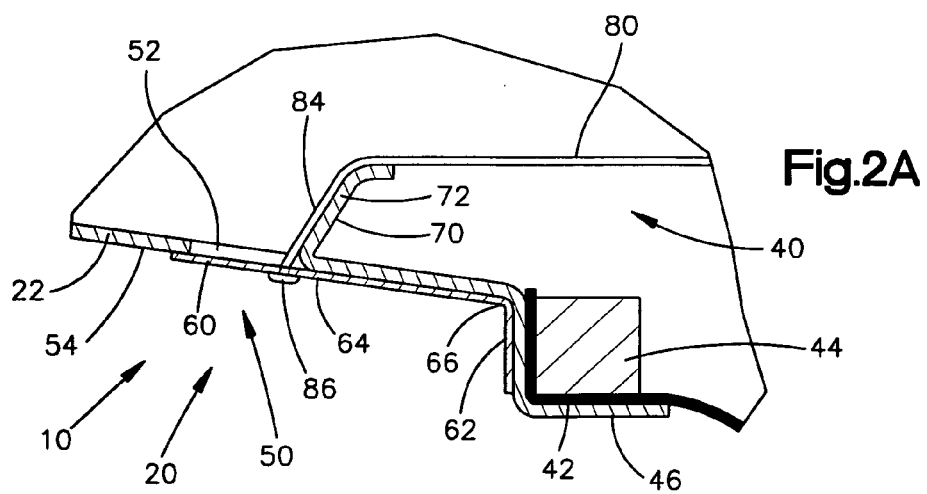
FIG. 2A is a magnified view of a portion of the apparatus of FIG. 2.

The air bag module 20 also includes a vent 50 through which inflation fluid may flow from the inflatable volume 26 of the air bag 14. As best shown in FIGS. 2A and 3A, the vent 50 includes a vent opening 52 that extends through a side wall 54 of the reaction canister 22. The vent opening 52 provides fluid communication between the inflatable volume 26 of the air bag and the atmosphere surrounding the air bag module 20. In the illustrated embodiment, the vent opening 52 is formed by cutting the side wall 54 and bending a portion 70 of the side wall away from the opening. This portion 70 defines a guide member 72, which is described in further detail below.

The vent 50 also includes a vent member 60 that is actuatable to block the vent opening 52 at least partially. The vent member has a base portion 62 secured to the reaction canister 22 by known means (not shown), such as welding, rivets, or fasteners. The vent member 60 also includes a door portion 64 and a hinge portion 66 that facilitates movement (e.g., pivotal movement) of the door portion 64 relative to the base portion 62. In the illustrated embodiment, the hinge portion 66 comprises a curved or bent portion of the vent member 60 that bends or otherwise deflects to permit movement of the door portion 64 from an open condition (FIGS. 3 and 3A) to a closed condition (FIGS. 2 and 2A).

According to the present invention, the air bag module 20 includes a vent actuating member in the form of a sheet or panel 80 that is configured to actuate the vent member 60. The panel 80 may be constructed of any material suited to exhibit the characteristics and perform the functions described herein. For example, the panel 80 may be constructed of a material that is similar or identical to those used to construct the air bag 14, such as woven nylon.

The panel 80 has a first end portion 82 secured to the reaction canister 22 and an opposite second end portion 84 secured to the door portion 64 of the vent member 60. In the illustrated embodiment, the first end portion 82 is clamped between the retainer 44 and channel 46 along with a portion of the peripheral portion 42 of the air bag 14. The second end portion 84 may be secured to the door portion 64 in any suitable manner. For example, the second end portion 84 may extend through an opening or slot in the door portion 64 and be folded over and stitched onto itself, thus creating a retaining portion 86 with an increased thickness that forms an interference that maintains the connection between the panel 80 and the door portion.

As shown in FIG. 4, the panel 80 has a width, identified generally at "W," about equal to or slightly less than the width of the vent opening 52. The width W of the panel 80 may thus extend across a substantial portion of the width of the reaction canister 22. Referring to FIGS. 2-4, the panel 80 extends from the door portion 64 through the vent opening 52 and along the guide member 72. The panel 80, having opposite end portions 82 and 84 connected to the reaction canister 22, includes a central portion 88 that spans across an inflation fluid discharge path of the inflator 24, indicated generally by the arrow 90 in FIGS. 2-4.

Referring to FIG. 1, upon sensing the occurrence of an event for which inflation of the air bag 14 is desired, such as a vehicle impact or collision, a sensor 100 provides an actuation signal to the inflator 24 via lead wires 102. Upon actuation of the inflator 24, inflation fluid is directed along the gas discharge path 90 into the air bag 14. The air bag 14 inflates and deploys under the pressure of inflation fluid provided by the inflator 24 from the stored position (shown at 14') to the deployed position (shown at 14). In the deployed position, the air bag 14 is positioned between the instrument panel 30 and the vehicle occupant 16.

During inflation and deployment of the air bag 14, inflation fluid is directed into engagement with the central portion 88 of the panel 80. The inflation fluid urges the central portion 88 away from the reaction canister 22 and causes the panel 80 to become taut, as shown in FIG. 2. The panel 80 slides or otherwise moves over guide portion 72 and exerts a force on the door portion 64 of the vent member 60 that urges the door portion toward the closed condition.

From the above, it will be appreciated that the panel 80 thus acts in a manner similar to a sail or parachute, catching or receiving the force of inflation fluid discharged from the inflator and transferring that force to the vent member 60 to place the vent member in the closed condition. In doing so, the panel 80 deflects or otherwise directs inflation fluid to flow laterally in a direction transverse to the inflation fluid discharge path 90 of the inflator 24. Because of this, at least a portion and, perhaps, a substantial amount of the inflation fluid discharged from the inflator 24 is directed away from a front panel or portion 92 of the air bag 14. As shown in FIGS. 1 and 2, the air bag module 20 is configured to leave a space 94 between the front portion 92 of the air bag 14 and the panel 80.

Those skilled in the art will appreciate that the amount of force placed on the door portion 64 is related to the size or area of the central portion 88 of the panel 80 acted on by the inflation fluid. The size or area of the central portion 88 may be adjusted, for example, by altering the shape or dimensions of the panel 80. For example, in the illustrated embodiment, panel 80 has a generally rectangular shape with a uniform width W and, therefore, the area of the central portion 88 can be affected by adjusting the width W of the panel. Alternatively, the shape of the panel 80 could be altered to adjust the area of the central portion 88, such as by flaring out or widening the central portion only.

According to the present invention, the area of the central portion 88 of the panel 80 acted on by the inflation fluid is selected such that the resulting force is sufficient to place the door portion 64 in the closed condition. The relatively wide configuration of the panel 80 in the illustrated embodiment may, for example, be selected to achieve the degree of force required to bend or deform of the hinge portion 66 to place the door portion 64 in the closed position.

Those skilled in the art will appreciate that the panel 80 may be configured to actuate vent members (not shown) having configurations different than the bent door configuration of the illustrated embodiment. For example, the panel 80 may be configured to actuate a vent member having a pivoting hinge construction. As another example, the panel 80 may be configured to actuate a sliding door or fabric vent member. As another alternative, a portion of the panel 80 itself may form a vent member. As a further alternative, the panel 80 may be configured to actuate any vent member suited for actuation via forces exerted via panel.

While the air bag inflates, some inflation fluid flows through the vent opening 52. The vent 50 directs inflation fluid away from the inflatable volume 26 and away from the air bag 14. This occurs until the panel 80 is tensioned and places the vent 50 in the closed condition, as described above. When the vent 50 is placed in the closed condition, inflation fluid flow through the vent opening 52 is at least partially blocked. Depending on the configuration of the air bag module 20, the vent opening 52 may be substantially or fully blocked when the vent 50 is in the closed condition.

Those skilled in the art will appreciate that the panel 80 is not secured to the air bag 14 and thus does not rely on movement or deployment of the air bag to place the vent 50 in the closed condition. Because closure of the vent 50 is predicated on movement of the panel 80 and not the air bag 14, vent closure can be configured to occur at any desired time during inflation by selecting an appropriate configuration (e.g., length and width) of the panel. For example, the vent 50 may be configured to close at a point in time closer to full deployment of the air bag 14 by increasing the length of the panel 80. Conversely, the vent 50 may be configured to close at a time increasingly prior to full deployment of the air bag 14 by decreasing the length of the panel 80. Once the vent 50 is closed, the rate at which the air bag 14 is pressurized increases. Therefore, the point during deployment of the air bag 14 at which an increase in the rate of pressurization is desired can be selected by choosing the appropriate length for the panel 80.

Those skilled in the art will appreciate that the vent 50 of the present invention may be selectively actuated depending on conditions in the vehicle 12 when the apparatus 10 is actuated. For example, in FIG. 1, the occupant 16 is in a normal seated position restrained by a seatbelt 104. In this scenario, there is sufficient space between the occupant 16 and the instrument panel 30 for the air bag 14 to inflate and deploy fully. The panel 80 is thus permitted to move a distance away from the instrument panel 30 sufficient to become tensioned and place the vent in the closed condition, as shown in FIGS. 2 and 2A. Because the vent is closed, the air bag 14 can deploy and pressurize rapidly. This helps the air bag 14 absorb and distribute the forces of impacts in a desired manner and helps provide a desired ride-down effect for the normally seated and belted occupant 16.

As another example, in FIGS. 3 and 3A, an object 110 is positioned in the deployment path of the air bag 14. The object 110 may, for example, be the occupant 16 positioned away from the normal seated position. In the scenario of FIGS. 3 and 3A, the space between the object 110 and the instrument panel 30 is insufficient for the panel 80 become tensioned to the degree necessary to apply a closing force to the door portion 64. Thus, for example, if the occupant 26 is positioned away from the normal seated position, the vent 50 remains in the open condition of FIGS. 3 and 3A and vents inflation fluid. Because of this venting, the air bag 14 may deploy and pressurize less rapidly than if the vent 50 were closed. This helps the air bag 14 absorb and distribute the forces of impacts and helps provide a desired ride-down effect for the occupant 16 positioned away from the normal seated position. Those skilled in the art will appreciate that the vent 50 may operate in the manner described above in the event that the object 110 on the vehicle seat is one other than an occupant.

Those skilled in the art will appreciate that the apparatus 10 may have alternative configurations without departing from the spirit of the present invention. For example, the air bag module 20 may be configured such that the vent member 60 is initially in the closed condition. This may, for example, help prevent debris and other foreign matter from entering the housing 22 through the vent 50. Upon actuation of the inflator 24, inflation fluid is discharged into the housing 22 and begins to fill the air bag 14. As fluid pressures increase in the housing 22, differential pressures across the vent 50 may cause the vent member 60 to move toward the open condition, which allows inflation fluid to flow through the vent while simultaneously inflating the air bag 14. Thereafter, as the air bag 14 continues to inflate and deploy, the panel 80 acts as described above to selectively place the vent member 60 in the closed condition.

From the above description of the invention, those skilled in the art will perceive improvements, changes, and modifications. Such improvements, changes, and modifications within the skill of the art are intended to be covered by the appended claims.

Having described the invention, we claim:

1. An apparatus for helping to protect an occupant of a vehicle, the apparatus comprising:

an inflatable vehicle occupant protection device inflatable to help protect an occupant of the vehicle;

a vent opening for directing flow of inflation fluid away from the protection device;

a vent member movable between an open condition enabling flow of inflation fluid away from the protection device through the vent opening and a closed condition at least partially blocking flow of inflation fluid away from the protection device through the vent opening; and a panel for receiving and transferring the force of inflation fluid directed into the protection device to the vent member to urge the vent member toward the closed condition, the panel being separate from the protection device and free from direct connections with the protection device, the protection device being constructed and arranged to be free from transferring force to the vent member that urges the vent member toward the closed condition.

2. The apparatus recited in claim 1, further comprising an inflator for providing inflation fluid for inflating the protection device, the panel having a first end portion secured to a reaction canister, the inflator when actuated directing inflation fluid against the panel causing the panel to move and urge the vent member toward the closed condition.

3. The apparatus recited in claim 2, wherein the vent opening comprises an opening in a side wall of the housing and the vent member has a door portion supported for movement relative to the vent opening between the open and closed conditions.

4. The apparatus recited in claim 3, wherein the panel has a second end opposite the first end, the second end being secured to the door portion of the vent member.

5. The apparatus recited in claim 4, wherein the housing supports the protection device and the inflator.

6. The apparatus recited in claim 1, wherein the vent member comprises a metal plate to which the panel is secured, the metal plate when tensioned by the panel being deformable from the open condition toward the closed condition.

7. The apparatus recited in claim 1, wherein the panel comprises an elongated sheet of woven fabric material.

8. The apparatus recited in claim 5, wherein the reaction canister defines a chamber for supporting the protection device and inflator, the apparatus further comprising a retainer that secures the protection device and the first end portion of the panel to the reaction canister.

9. The apparatus recited in claim 8, wherein the vent opening comprises an opening in a side wall of the reaction canister and the vent member is positioned adjacent the vent opening, the panel extending across the chamber and being at least partially positioned in a discharge path of the inflator.

10. The apparatus recited in claim 8, wherein the vent opening comprising an opening in a side wall of the reaction canister and the vent member being positioned adjacent the vent opening outside the chamber, the second end portion of the panel extending through the vent opening and being secured to the vent member.

11. The apparatus recited in claim 8, wherein the first end portion of the panel is clamped between the reaction canister and the retainer.

12. The apparatus recited in claim 2, wherein the panel directs inflation fluid to flow transverse to an inflation fluid discharge direction of the inflator.

13. The apparatus recited in claim 1, wherein the panel is disposed in an inflatable volume of the protection device.

14. The apparatus recited in claim 1, wherein the panel comprises a sheet of woven fabric.

15. The apparatus recited in claim 2, wherein the vent member is in the closed condition prior to actuation of the inflator, the vent member being initially placed in the open condition in response to inflation fluid pressure and subsequently being selectively placed in the closed condition by the panel.

16. The apparatus recited in claim 1, wherein the panel is constructed and arranged so that the force transferred to the vent member is applied by the panel only.

17. The apparatus recited in claim 1, wherein the panel and the protection device are constructed and arranged so that the apparatus does not rely on movement or deployment of the air bag to place the vent member in the closed condition.

18. An apparatus for helping to protect an occupant of a vehicle, the apparatus comprising:
   an inflatable vehicle occupant protection device inflatable to help protect the vehicle occupant;
   an inflator for providing inflation fluid for inflating the protection device;
   a reaction canister that defines a chamber for supporting the protection device and the inflator, the reaction canister comprising a vent opening for directing inflation fluid flow away from the protection device;
   a vent member comprising a door portion supported for movement relative to the vent opening between an open condition enabling flow of inflation fluid away from the protection device through the vent opening and a closed condition at least partially blocking flow of inflation fluid away from the protection device through the vent opening;
   a panel having a first end portion secured to the reaction canister and a second end portion secured to the door portion; and
   a retainer that secures the protection device and the first end portion of the panel to the reaction canister, wherein the panel extends from a first side wall of the reaction canister across the chamber to an opposite second side wall of the reaction canister, the inflator when actuated directing inflation fluid against the panel, the panel receiving and transferring the force of inflation fluid directed into the protection device to the door portion to urge the door portion toward the closed condition.

19. An apparatus for helping to protect an occupant of a vehicle, the apparatus comprising:
   an inflatable vehicle occupant protection device inflatable to help protect the vehicle occupant;
   an inflator for providing inflation fluid for inflating the protection device;
   a reaction canister that defines a chamber for supporting the protection device and inflator, the reaction canister comprising a vent opening for directing inflation fluid flow away from the protection device;
   a vent member comprising a door portion supported for movement relative to the vent opening between an open condition enabling flow of inflation fluid away from the protection device through the vent opening and a closed condition at least partially blocking flow of inflation fluid away from the protection device through the vent opening;
   a panel having a first end portion secured to the reaction canister and a second end portion secured to the door portion, the panel extending across the chamber and being at least partially positioned in a discharge path of the inflator; and
   a retainer that secures the protection device and the first end portion of the panel to the reaction canister, the panel receiving and transferring the force of inflation fluid directed into the protection device to the door portion to urge the door portion toward the closed condition.

20. An apparatus for helping to protect an occupant of a vehicle, the apparatus comprising:
   an inflatable vehicle occupant protection device inflatable to help protect an occupant of the vehicle; and
   a panel separate from the protection device, free from direct connections with the protection device, and disposed in an inflatable volume of the protection device, the panel configured to receive inflation fluid directed into the inflatable volume and transfer the force of inflation fluid directed into the inflatable volume to a vent member to actuate the vent member, wherein the protection device is constructed and arranged to be free from transferring force to the vent member that urges the vent member toward the closed condition.

21. The apparatus recited in claim 20, wherein the panel is constructed and arranged so that the force transferred to the vent member is applied by the panel only.

22. The apparatus recited in claim 20, wherein the panel and the protection device are constructed and arranged so that the apparatus does not rely on movement or deployment of the air bag to place the vent member in the closed condition.

* * * * *